United States Patent
Keithley et al.

(10) Patent No.: US 8,233,196 B1
(45) Date of Patent: Jul. 31, 2012

(54) HALFTONER BLOCK EMPLOYING AVERAGE VALUES AND SHIFTS

(75) Inventors: Douglas G. Keithley, Boise, ID (US); Randall D. Briggs, Boise, ID (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/205,406

(22) Filed: Aug. 8, 2011

Related U.S. Application Data

(63) Continuation of application No. 11/780,353, filed on Jul. 19, 2007, now Pat. No. 7,995,244.

(60) Provisional application No. 60/820,539, filed on Jul. 27, 2006.

(51) Int. Cl.
*H04N 1/405* (2006.01)
*G06K 15/00* (2006.01)

(52) U.S. Cl. .............. 358/3.06; 358/1.9; 358/3.03

(58) Field of Classification Search ............ 358/1.1, 358/1.9, 2.99, 3.01, 3.03, 3.06; 382/251, 382/252
See application file for complete search history.

(56) References Cited

U.S. PATENT DOCUMENTS

| | | | |
|---|---|---|---|
| 5,077,680 A * | 12/1991 | Sturm et al. | ............ 358/1.5 |
| 5,602,653 A | 2/1997 | Curry | |
| 7,031,025 B1 | 4/2006 | He et al. | |
| 7,164,502 B2 | 1/2007 | Nose et al. | |

\* cited by examiner

*Primary Examiner* — Thomas D Lee

(57) ABSTRACT

Halftoning apparatus and method that may generate and employ average values and shifts are described herein. The apparatus may include an unpacker to determine shifts and average values for a plurality of input pixel values, each pair of average value and shift being associated with a corresponding pair of the input pixel values. The apparatus may further include a halftone core coupled to the unpacker to receive the shifts and the average values from the unpacker and to generate pairs of output pixel values based at least in part on the received shifts and average values, wherein the output pixel values are for generating pixels of an image.

16 Claims, 10 Drawing Sheets

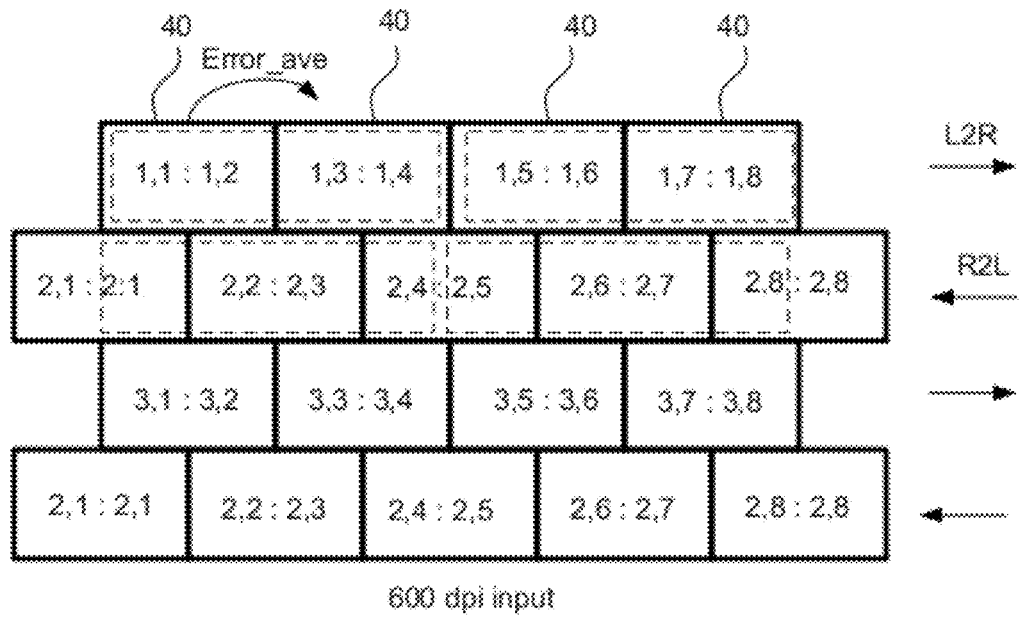
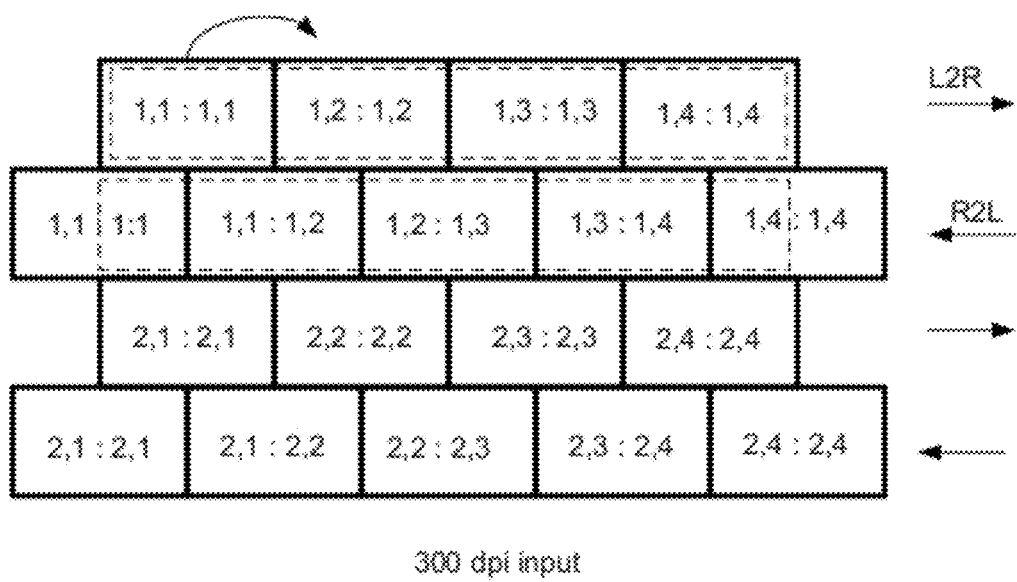

| z | 2^(z-1) | data(m,n) | data(m,n-1) | Actual | Integer result | Result using rounding |
|---|---------|-----------|-------------|--------|----------------|----------------------|
| 4 | 8       | 55        | 36          | 1.69   | 1              | 2                    |

HALFTONER BLOCK EMPLOYING AVERAGE VALUES AND SHIFTS

CROSS-REFERENCES TO RELATED APPLICATIONS

The present application is a continuation of U.S. patent application Ser. No. 11/780,353, filed Jul. 19, 2007, which claims priority to U.S. Patent Application No. 60/820,539, filed Jul. 27, 2006, entitled "Optimized Error Diffusion Halftoning Block," the entire disclosures of which are hereby incorporated by reference in its entirety for all purposes.

TECHNICAL FIELD

Embodiments of the present invention relate to the field of data processing, and more particularly, to image data processing for generating images.

BACKGROUND

When image data is received by a printer device, a number of processes such as digital halftoning may be performed on the inputted image data in order to generate the end images. Digital halftoning is a process of transforming a continuous-tone image into a lower bit-depth image that has the illusion of the original continuous-tone image. Halftoning can be implemented for generating either color or monochromatic (i.e., black and white) images.

For example, in order to produce a pixel for an image that was originally intended to be a continuous-tone image using, for example, a monochromatic printer, 8-bits of data may be initially provided to the printer to indicate a grey scale for that pixel. In the following description, and for ease of understanding, the grey scale indicated by the original 8 bits of data will be referred to as an "input pixel value." The 8 bits provided may define one of 256 different levels or shades of grey (e.g., from black at one end, to white at the other end, and different shades of grey in-between). However, printers are typically binary devices that may have limited ability to print many different shades of grey (for color printers, to print many variations of color). If a printer prints based on 1-bit data for each pixel, a pixel may be either black or white. For printers that print based on 2-bit data, a pixel can be black, white, or two shades of grey. The result of a halftoning process is to convert an input pixel value as defined by, for example, 8 bits of data, into an output pixel value, as defined by, for example, 1-bit data, a 2-bit data, or a 4-bit data (thus the term "lower bit-depth").

Conversion of an input pixel value into lower bit depth value during the halftoning process may unfortunately result in error. In order to compensate for such errors, the halftoning process typically employs an error diffusion process in which the error associated with an image pixel generated during the halftoning process is diffused to the surrounding image pixels.

In part, because of the many processes that are typically performed on the inputted image data, including those processes described previously, printers typically employ a large amount of memory such as static random access memory (SRAM) to store the data being processed. Employing large amounts of memory in a printer device may be prohibitive because it tends to increase the overall cost of such printer device and may increase the complexity of the printer system.

SUMMARY OF INVENTION

According to various embodiments of the present invention, halftoning methods and apparatuses are provided that may reduce the memory requirements for processing image data used to generate images by a printer. In particular, embodiments of the present invention may provide for a halftoner block that may employ average values and shifts determined from pairs of input pixel values in order to produce output pixel values to be used for generating pixels of images.

The halftoner block may include sub-blocks including, for example, a read direct memory access (read DMA), an unpacker, a halftoner core, a packer, and a write DMA. In various embodiments, the read DMA may be designed to retrieve or read input image data comprising a plurality of input pixel values from a memory, and to provide the input pixel values to the unpacker. Upon receiving the input pixel values, the unpacker may determine shifts and average values for the input pixel values, wherein for each pair of input pixel values received, a corresponding shift and average value may be determined. In order to determine the average values, the unpacker may be designed to determine the average values by calculating an error average for a first average value and determining a second average value based at least in part on the determined error average. In some embodiments, the unpacker may determine a shift based on a distribution of a pair of the input pixel values. After determining the shifts and average values, the unpacker may provide the shifts and average values to the halftone core.

In accordance with various embodiments of the present invention, the halftone core may receive the shifts and the average values from the unpacker and generate pairs of output pixel values based at least in part on the received shifts and average values, the output pixel values for generating pixels of an image. In some embodiments, the halftone core may be designed to generate a pair of the output pixel values based at least in part on a corresponding shift and average value pair received from the unpacker. The halftone core may be further designed to generate for each average value provided by the unpacker a corresponding size to be used for generation of a pair of the output pixel values. The halftone core may be further designed to perform error diffusion processes for each of the average values provided, the error diffusion processes to provide corrected data to facilitate in the generation of the sizes. In some embodiments, the halftone core may include a shifty block to receive the sizes and shifts generated, and to generate the pairs of the output pixel values based at least in part on the sizes and shifts received.

In various embodiments of the present invention, the input pixel values may each be defined by x bits of data and the output pixel values may each be defined by y bit(s) of data, with x being greater than y. In some embodiments, the unpacker may be designed to receive input pixel values that are each defined by 8 bits of data or some other bits of data while the halftone core may be designed to generate output pixel values that are each defined by 1, 2, 4 or other bits of data.

The output pixel values outputted by the halftoner block may be provided to the packer to be packed into blocks of data such as 32-bit blocks. The packed blocks of data may then be provided to the write DMA to be written or stored into a memory and/or to be provided to a video block. In some embodiments, the video block may add justification information to the output pixel values to facilitate the generation of the pixels of the image.

These and other aspects of various embodiments of the present invention will now be described in greater detail below.

BRIEF DESCRIPTION OF THE DRAWINGS

The present invention will be described by way of exemplary embodiments, but not limitations, illustrated in the accompanying drawings in which like references denote similar elements, and in which:

FIG. 3 illustrates exemplary blocks that represent pairs of input pixel values for 600 dpi input image data, in accordance with various embodiments of the present invention;

FIG. 4 illustrates exemplary blocks that represent pairs of input pixel values for 300 dpi input image data, in accordance with various embodiments of the present invention;

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the instant description, the phrase "A/B" means A or B. For the purposes of the instant description, the phrase "A and/or B" means "(A), (B), or (A and B)." For the purposes of the instant description, the phrase "at least one of A, B and C" means "(A), (B), (C), (A and B), (A and C), (B and C) or (A, B and C)." For the purposes of the instant description, the phrase "(A)B" means "(B) or (AB)," that is, A is an optional element.

The description may use the phrases "in various embodiments," or "in some embodiments," which may each refer to one or more of the same or different embodiments. Furthermore, the terms "comprising," "including," "having," and the like, as used with respect to embodiments of the present invention, are synonymous.

Figure 1:
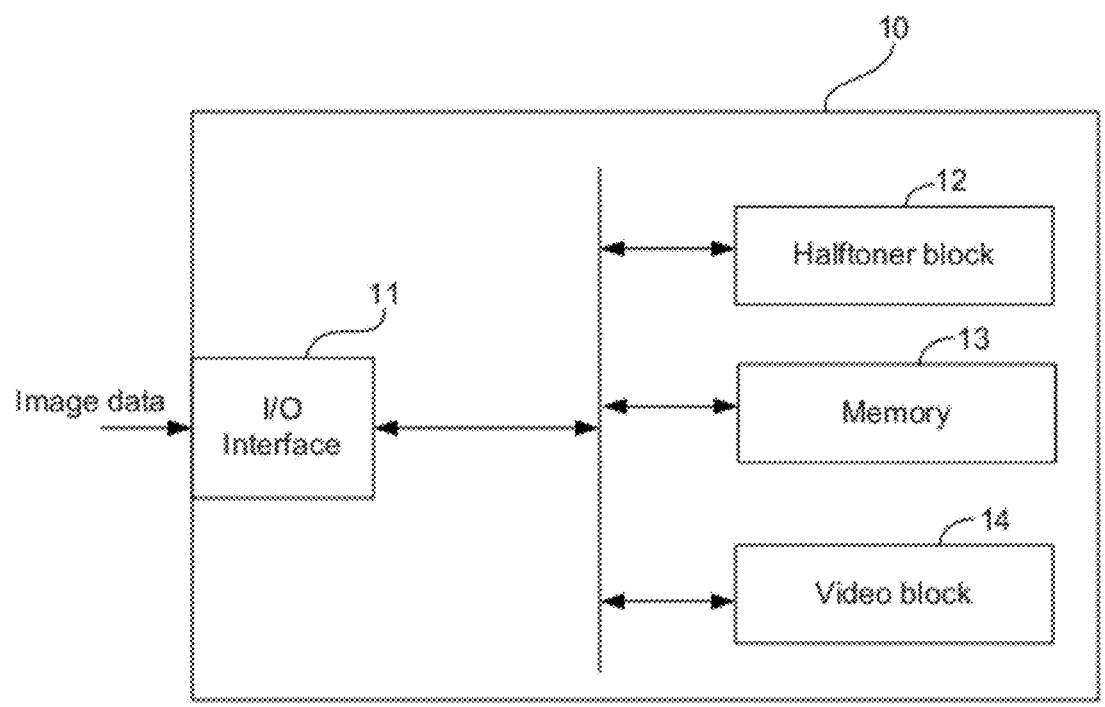
FIG. 1 is a block diagram of an exemplary system for generating images, in accordance with various embodiments of the present invention.

FIG. 1 is a block diagram of an exemplary system for generating images, in accordance with various embodiments of the present invention. In some embodiments, the system 10 may be a printer such as, for example, a laser printer. As depicted, the system 10 includes an input/output (I/O) interface 11, a halftoner block 12, a memory 13, and a video block 14, coupled together as shown. Other components such as a central processing unit (CPU), specialized controllers and/or processors, decompression blocks, printer engine, laser, and so forth, may also be included in the system 10, but are omitted for clarity of illustration and description.

In various embodiments, the system 10 may receive input image data through the I/O interface 11 from an external source such as a desktop computer, a laptop computer, a server, a scanner, a personal digital assistant (PDA), a camera, or any other device capable of providing image data via a wired and/or wireless communication link. In some instances, the input image data received through the I/O interface 11 may be initially stored in the memory 13. The input image data that may be stored in the memory 13 may comprise multiple 8-bit increments (i.e., byte) of data, each 8 bits of data defining an input pixel value for a pixel of an image to be generated. Alternatively, the image data that may be stored in the memory 13 may comprise other bit increments of data such as, for example, 16-bit increments.

After storing the input image data in memory 13, the system 10 may perform various operations in order to generate or print one or more images. In particular, the input image data stored in the memory 13 may be retrieved (i.e., read) by the halftoner block 12 in order to perform, among other things, halftoning processes. The output from the halftoner block 12 may either be stored in memory 13, to be subsequently retrieved by the video block 14, or may be sent directly to the video block 14 for further processing and/or for generating the end images.

Figure 2:
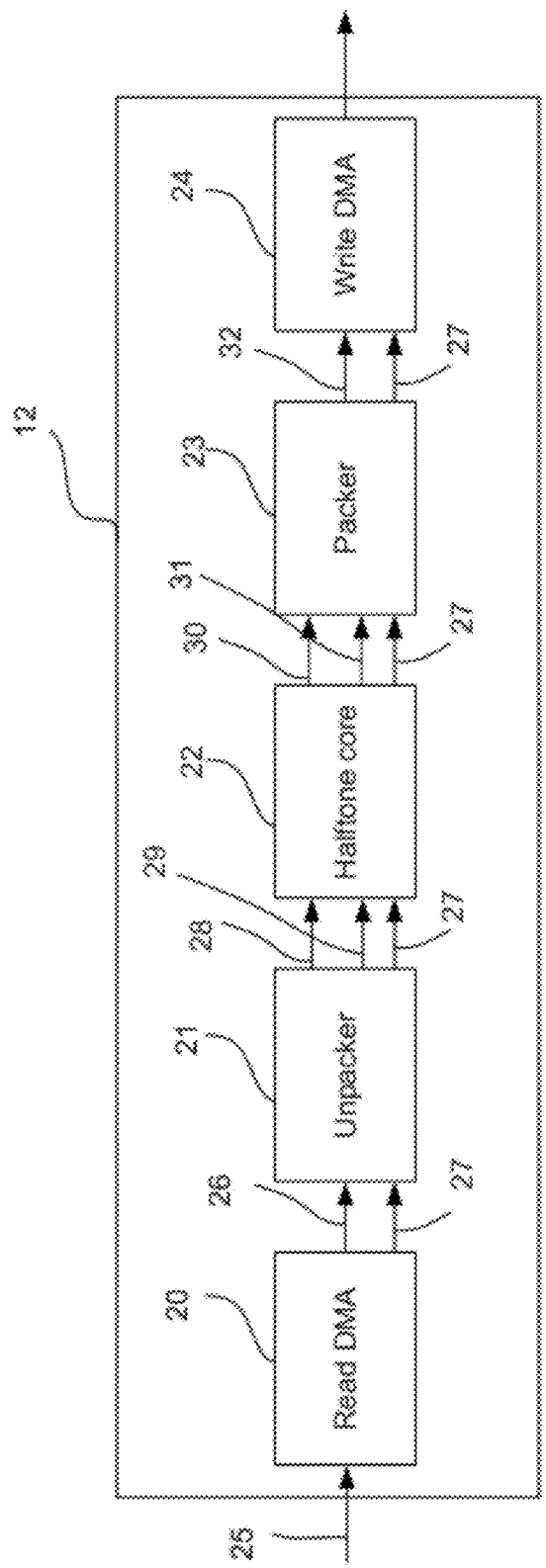
FIG. 2 illustrates a block diagram of a halftoner block illustrated in FIG. 1, in accordance with various embodiments of the present invention.

FIG. 2 illustrates the halftoner block 12 of FIG. 1, in further detail, in accordance with various embodiments of the present invention. The halftoner block 12, as depicted, includes sub-blocks including a read direct memory access (read DMA) 20, an unpacker 21, a halftone core 22, a packer 23, and a write DMA 24, operatively coupled together as depicted.

The read DMA 20 may initially retrieve or read input image data 25 stored in the memory 13 in a serpentine fashion. That is, the input image data stored in memory may be stored in a continuous manner. Thus, the input image data retrieved by the read DMA 20 may be read according to alternating directions, for example, pixel data for a first image line (i.e., scan line) may be read from right to left, and the image data for a second image line may be read from left to right, and so forth. In various embodiments, the read DMA 20 may be designed to read 300 dots per inch (DPI) image data, 600 dpi image data, and/or some other types of image data. In some embodiments, the read DMA 20 may perform line replication (e.g., when 300 dpi image data is received and in essence, needs to be converted to 600 dpi image data when printing data at a resolution that is lower than the native print image). This replication process, as performed by the read DMA 20, may duplicate the input image data vertically, while the unpacker 21, as will be described below, may duplicate the input image data horizontally.

In various embodiments, the read DMA 20 may output to the unpacker 21, 32-bit blocks of input image data as indicated by 26. Each 32-bit block may include four bytes (8 bits per byte) to define four input pixel values for four pixels of an image line (i.e., scan line). Accompanying the 32-bit blocks provided to the unpacker 21 may be various flags to indicate the start of image signal (SOI), start-of-line (SOL), end-of-line (EOL), and direction information (direction to scan the image data for each image line) as indicated by 27. As shown, these flags may be passed along to the other sub-blocks of the halftoner block 12.

Because the read DMA 21 retrieves or reads the input image data in a serpentine fashion, the unpacker 21 may unpack the 32-bit blocks received from the read DMA 20 so that the input image data may be properly processed in subsequent operations. The unpacking operation may be performed line by line either left-to-right (L2R) or right-to-left (R2L). According to various embodiments of the present invention, the unpacker 21 may be designed to take the 32-bit data blocks received from the read DMA 20, pair up the input pixel values as defined by the 32-bit data blocks (recall that each 32-bit block may define four input pixel values for four image pixels), and calculate average values 28 and shifts 29 for each pair of image pixels (herein "pixels") to be generated or printed. The average values 28 and the shifts 29 that are calculated for each pair of pixels may then be provided to the halftoner core 22. In some embodiments, if the system 10 receives 300 dpi input image data, the unpacker 21 may replicate the input pixel values horizontally (as opposed to vertically as done in the read DMA 20).

As described above, for each pair of input pixel values received by the unpacker 21, a corresponding average value 28 and a shift 29 may be determined. An average value is the magnitude of a pair of input pixel values while the shift is how the magnitude is distributed within the pair. After generating the averages values 28 and shifts 29 for each pair of input pixel values, the average values 28 and shifts 29 are provided to the halftone core 22.

To facilitate an understanding of how the average values and shifts may be determined by the unpacker 21, FIG. 3 is provided which depicts blocks 40 that represent pairs of input pixel values organized along scan lines for 600 dpi input image data. Each block represents an input pixel value for a left pixel and an input pixel value for a right pixel. Thus, each block also represents pairs of pixels of an image. In this illustration, each input pixel value is represented by a row number (m) and a column number (n)—thus (m,n), with each row representing a scan line. As previously described, for each pair of input pixel values, an average value and a shift is determined. The dotted rectangles represent 32-bit input data blocks. The arrows on the right indicate the directions that the input pixel values are to be processed. For every other row, the unpacker 21 may replicate the end pixel values. Thus, and as depicted, the two end pixel values (2,1) and (2,8) in the second row have been replicated. The reason for this is to assure that the blocks (i.e., pixels) in one row are offset from the blocks in the next row, which may assure the formation of a checkerboard pattern as is known in the art. The replicated pixel values may be later thrown away before the image is printed.

FIG. 4 is similar to FIG. 3 and depicts pairs of input pixel values represented by blocks and organized along scan lines for 300 dpi input image data (instead of 600 dpi input image data as was the case for FIG. 3). Note that because the input image data is 300 dpi input image data, the input pixel values have been replicated both horizontally and vertically as a result of the replication process that may be performed by the read DMA 20 and the unpacker 21.

Each time an average value is determined for a pair of input pixel values, an error term, which may be referred to subsequently herein as "error average," may be generated from that pair. Such an error term may be used in order to calculate the average value of a "succeeding" pair of input pixel values as will be described in greater detail below. The error term (i.e., Error_ave below), in some embodiments, may simply be the remainder of the averaging operation as described below. The error term (i.e., error average) may not propagate to the next scan line, thus each scan line begins its first error average with an error term of zero.

Below are equations for determining error average, average value and shift for a pair of input pixel values, in accordance with various embodiments of the present invention:

$$\text{Error\_ave} = \text{mod}[(\text{data}(m,n) + \text{data}(m,n-1) + \text{Error\_ave}(m,p-1)), 2]$$
$$\text{Ave} = [(\text{data}(m,n) + \text{data}(m,n-1) + \text{Error\_ave}(m,p-1)]/2$$
$$\text{Shift} = (2^{(z-1)} + \text{data}(m,n) - \text{data}(m,n-1)) >> z$$

">>" = arithmetic shift right
m = image row
n = image column
p = pixel pair
z = derived from the shift value (SV) field of a halftoner block algorithm register. The SV field (2-bit) of the algorithm register may appear as follows:
SV:  Shift Value - scales the Shift value calculated in first stage pixel averaging. The "shift by" value below is the "z" term in the Shift equation above.
00: shift by 4 (/16)
01: shift by 5 (/32)
10: shift by 6 (/64)
11: shift by 7 (/128)

Figures 5, 6:
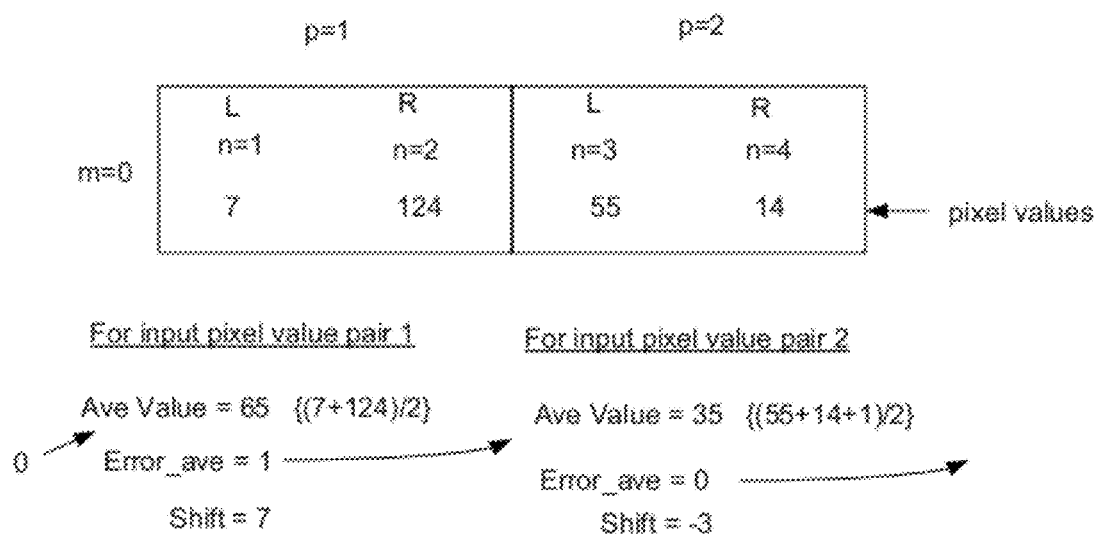
FIG. 5 illustrates an example of how a shift may be determined, in accordance with various embodiments of the present invention.
FIG. 6 illustrates an example of how an error average (Error_ave) from a preceding pair of input pixel values may be used in order to determine the average value of a succeeding pair of input pixel values, in accordance with various embodiments of the present invention.

In the Shift equation above, the $2^{(z-1)}$ term is added in order to provide proper rounding. It effectively adds ½ as demonstrated by the example provided in FIG. 5. For each input pixel value pair, data (m,n) is associated with the right pixel while data (m,n−1) is associated with the left pixel. FIG. 6 illustrates how an error average (Error_ave) from a preceding pair of input pixel values may be used in order to determine the average value of a succeeding pair of input pixel values. Note that the terms "preceding" and "succeeding" are terms that may only be relative with respect to the scan direction (i.e., L2R or R2L).

In this example, the first input pixel value pair is the first input pixel value pair of a scan line. Thus, no error average is added in order to determine the average value of the first input pixel value pair. In order to determine the average value of the second input pixel value pair, the error average (i.e., 1) from the first input pixel value pair is added in order to determine the average value of the second input pixel value pair. Note that the shifts for the pixel value pairs are signed (e.g., a positive or negative value because of directionality) while the average values are unsigned (because the average values are magnitude without directionality). Again, a shift may indicate whether the magnitude of an input pixel value pair is weighted to the left or the right pixel.

Figure 7:
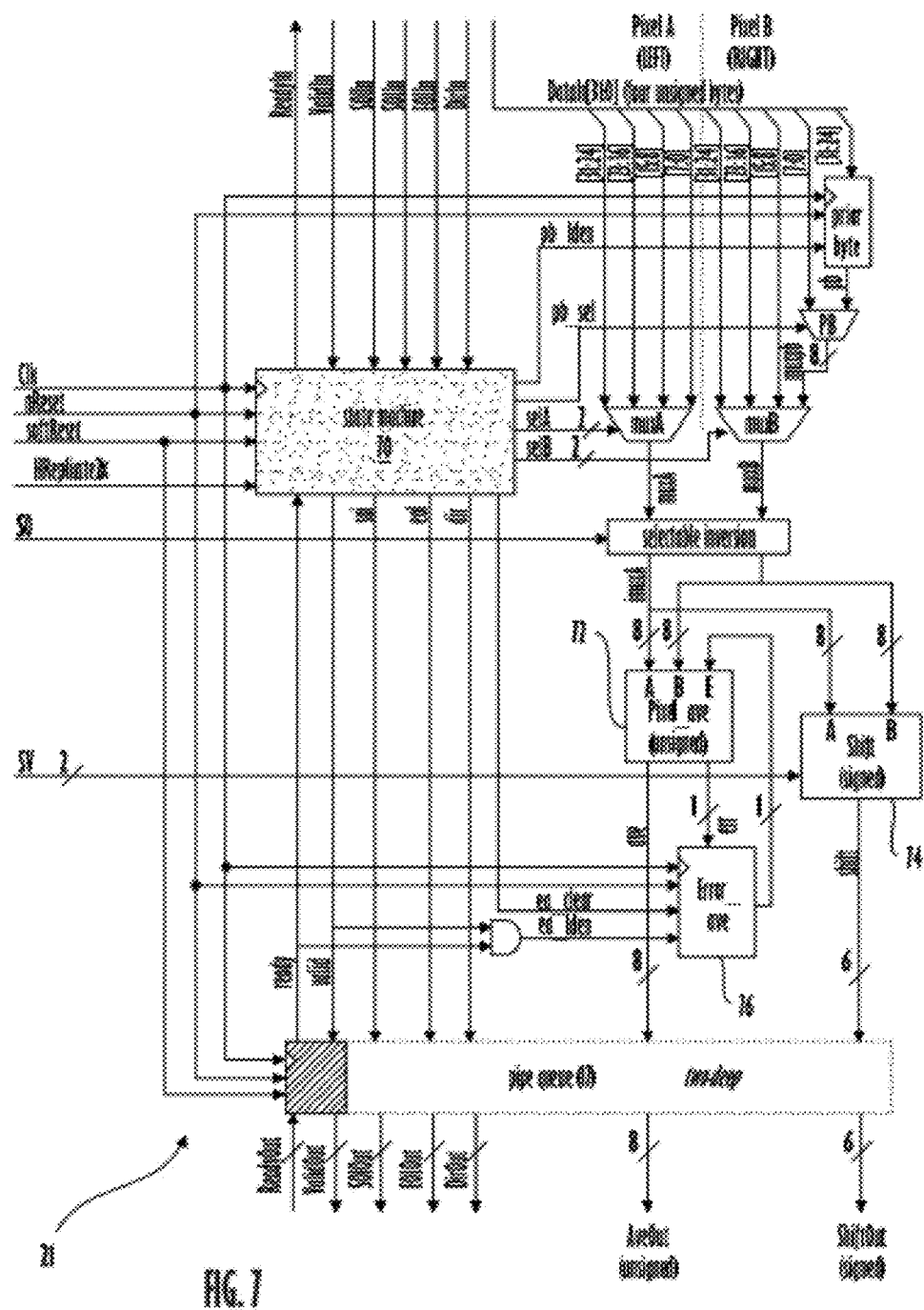
FIG. 7 illustrates a block diagram of a unpacker illustrated in FIG. 2, in accordance with various embodiments of the present invention.

FIG. 7 is a block diagram of the unpacker 21 of FIG. 2 in accordance with various embodiment of the present invention. As depicted, the unpacker includes a state machine (i.e., controller) 70, a pixel averaging block 72, an shift block 74, and an error average block 76, operatively coupled together as illustrated. The pairs of input pixel values (depicted as Pixel A and Pixel B) provided by the read DMA 20 are received though the top right corner of the diagram. At the bottom right side of the diagram are the outputs of the unpacker 21, specifically the average values and shifts determined for each pair of input pixel values, which are provided to the halftone core 22 shown as references 28 and 29 in FIG. 2.

After receiving the average values 28 and shifts 29 from the unpacker 21, the halftone core 22 may perform halftoning and error diffusion operations, and for each pair of average value and shift received from the unpacker 21 determine and generate an output pixel value for a left pixel and an output pixel value for a right pixel as indicated by 30 and 31 in FIG. 2. In some embodiments, the output pixel values 30 and 31 generated by the halftone core 22 may be defined by 1, 2, 4, or some other number of bits of data. Note that the output pixel values 30 and 31 outputted by the halftone core 22 may be referred to in the following description as video codes or vcodes. Upon receiving the output pixel values 30 and 31 from the halftone core 22, the packer 23 may perform various operations on the output pixel values 30 and 31 received from the halftone core 22 including packing the output pixel values 30 and 31 into 32-bit data blocks (as indicated by reference 32) to be used by the write DMA in order to write the output of the halftoner block 12 into the memory 13. Details of the halftone core 22, the packer 23, and write DMA 24 will now be discussed in greater detail.

The halftone core 22 may perform, among other things, the halftoning and error diffusion processes previously alluded to. The halftone core 22 may take and process an average value and shift pair provided by the unpacker 21 and produce a pair of 1 or 2 or 4 (i.e., 1/2/4) bit outputs (i.e., vcodes). Alternatively, and as previously alluded to, the halftone core 22 may produce a number of bit outputs other than 1/2/4 bit outputs. The pair of 1/2/4 bit outputs may define an output pixel value for a left pixel and an output pixel value for a right pixel. Note that when the average value of the average value and shift pair is being processed by the halftone core 22, an error diffusion operation may be performed.

The general concept of error diffusion is well known in the art. As previously described, the error diffusion process is performed because when, for example, an 8-bit input pixel value data is converted to 1/2/4 bit data during the halftoning operation, the quality of the image that may be created suffers as a result of the conversion process not taking into account error values that occur during the conversion process. An "error value" may be the difference between a multiple of the outputted binary pixel value (e.g., 1/2/4 bit data) and the inputted grey level value of the pixel before conversion. In order to improve the resulting image, error values of the pixels may be diffused to adjacent pixels during the halftoning process.

An error diffusion process, in accordance with various embodiments of the present invention, is illustrated in the following example with reference to FIG. 8. In particular, the error diffusion process described below applies the error diffusion to average values (as provided by the unpacker 21) instead of to input pixel values, as may be the case in conventional error diffusion processes. As a result, memory requirements in the form of, for example, SRAM, may be reduced in the halftone core 22. Note that although the following example describes one error diffusion approach, which may be referred to as simple error diffusion, other error diffusion methods such as blue noise error diffusion and amplitude modulation/frequency modulation (AM/FM) diffusion may also be employed in alternative embodiments.

Figure 8:
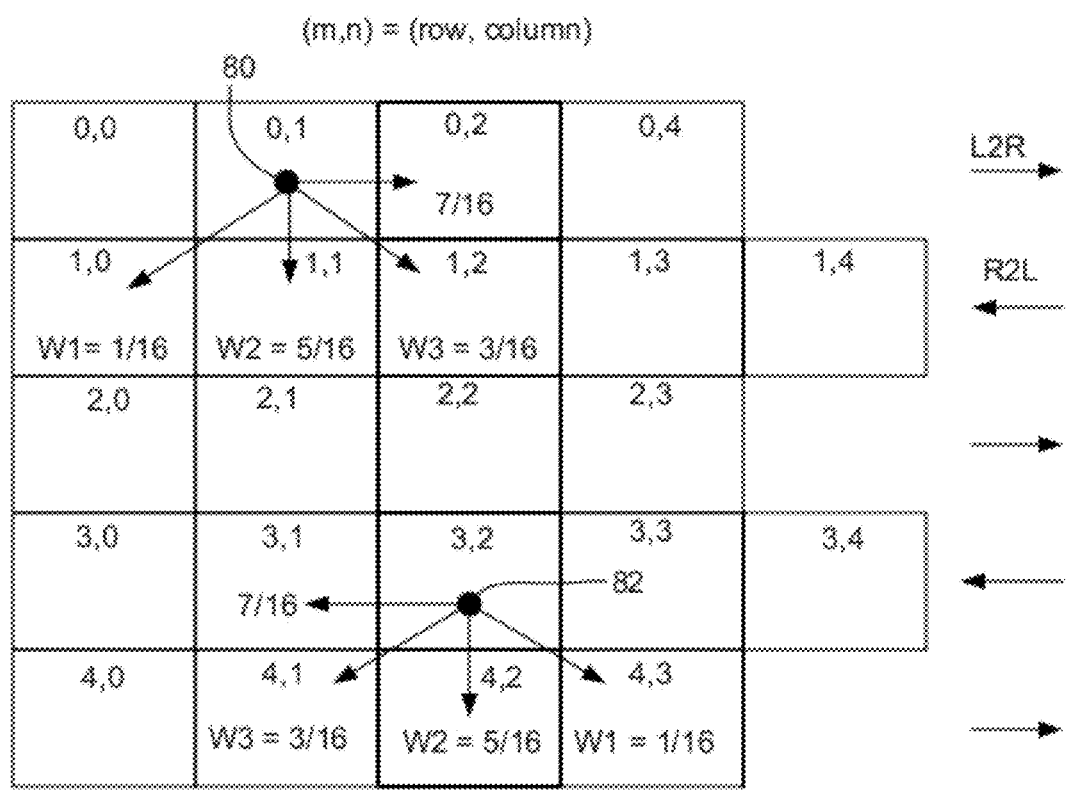
FIG. 8 illustrates dispersion patterns for an error diffusion process, in accordance with various embodiments of the present invention.

FIG. 8 illustrates two error dispersion patterns in accordance with various embodiments of the present invention. In particular, FIG. 8 depicts two error dispersion patterns 80 and 82 overlaying on top of cells, each cell representing an average value outputted by the unpacker 21 and organized according to scan lines. To implement the error dispersion process, the error term for the average value at cell (0,1) is dispersed to four adjacent cells (i.e., four adjacent average values). By dispersing the error term, corrected data or average values may be obtained for the adjacent cells.

The dispersion of the error term may be in accordance with dispersion weights (i.e., W1, W2, and W3) as shown. For example, if the error term for cell (0,1) is 160, one cell (1,0) will get an error value of 10 (160×1/16), one cell (1,1) will get an error value of 50 (160×5/16), one cell (1,2) will get an error value of 30 (160×3/16). Note that there are only three weights depicted (W1, W2, and W3) because the fourth cell (0,2) will get the remainder error term. The weights may be set weights that are used over and over again (stored in one of the registers in the halftone core). As depicted, the second dispersion pattern 82 at cell (3,2) is the mirror image of the first dispersion pattern because cell (3,2) is located on a scan line where the processing is done R2L as opposed to L2R. The error terms that are dispersed may then be used to recalculate the average values of the cells. Although the above example illustrates the use of only three weights, those skilled in the art will understand that fewer or more weights may be employed to disperse the error term.

Figure 9:
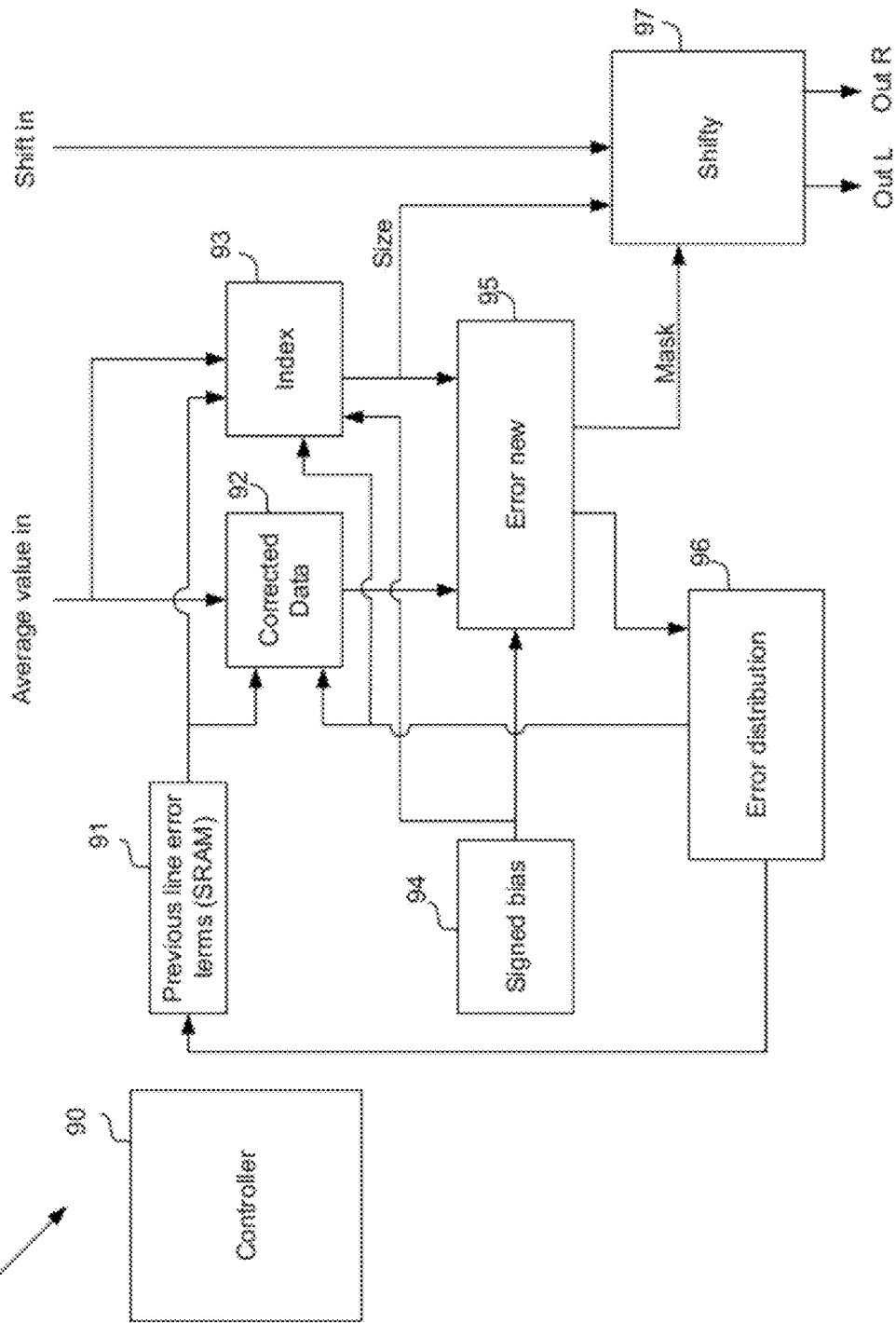
FIG. 9 illustrates a block diagram of a halftone core illustrated in FIG. 2, in accordance with various embodiments of the present invention.

FIG. 9 is a block diagram of the halftone core 22 of FIG. 2 in accordance with various embodiments of the present invention. As depicted, the halftone core 22 includes a controller (i.e., state machine) 90, a previous line error terms block 91, a corrected data block 92, an index block 93, a signed bias block 94, an Error new block 95, an error distribution block 96, and a shifty block 97. Controller 90 controls one or more of the components illustrated in FIG. 9 and thus is operatively coupled to one or more of the components, but is illustrated in FIG. 9 as a stand-alone device for clarity. As indicated in the upper right portion of FIG. 9, the halftone core 22 receives average values and shifts from the unpacker 21. In various embodiments, the previous line error terms block 91, the corrected data block 92, the index block 93, the signed bias block 94, the Error new block 95, and the error distribution block 96 may cooperatively operate together in order to perform error diffusion operations using the average values received from the unpacker 21. The output of the halftone core 22, which are pairs of output pixel values, is shown below the shifty block 97. The outputs (i.e., Out L and Out R), as previously indicated, may be referred to as video codes or vcodes.

In order to appreciate how error diffusion operations may be executed using the components of the halftone core 22, the previous error diffusion example will now be described from a different perspective. To begin, note that in the previous error diffusion example, it was shown how an error value is dispersed from one (average value) cell to four adjacent (average value) cells. Another way to view the previous example is that a first (average value) cell will receive four error terms from four other (average value) cells, three of these cells will be located on the scan line that is directly above the scan line where the first cell is located. The fourth cell will be located on the same scan line as the first cell (the fourth cell should be the cell that is processed just before the first cell). Recall also that the average values (as represented by the cells in FIG. 8) received from unpacker 21 may be processed line by line (either L2R or R2L). Thus, the previous line error terms block 91, which may comprise of SRAMs, may store error terms from the previous scan line to be applied to "the current" cell (i.e., current average value).

The error terms stored in the previous line error terms block 91 may then be provided to the corrected data block 92. In the case of the previous example, three error terms (or other number of error terms) from the previous line may be stored in the previous line error terms block 91. Note that the error distribution block 96, which generates the error terms for the error diffusion processes, is directly coupled to the corrected data block 92 (as well as to the previous line error terms block 91) to directly provide the fourth error term from a cell that is located on the same scan line as the current cell.

The signal bias block 94 may generate random threshold values that are used during the error diffusion operations to determine error terms. The Error new block 95 may calculate the error in the current cell (i.e. 80 or 82 in FIG. 8) that is to be distributed to the adjoining cells. The Error new block 95 may also perform a halftoning operation by determining if the current cell exceeds a given threshold. Based at least in part on the error diffusion operations performed, the index block 93 may generate, for each average value received from the unpacker 21, a corresponding "size." The sizes that are generated by the index block 93 are then provided to, among other things, the shifty block 97. The shifty block 97 using the sizes provided by the index block 93, the shifts received from unpacker, and the masks from Error new block 95, may generate, for each pair of size and shift values, a right and a left output pixel value as indicated by Out L and Out R below the shifty block 97 in FIG. 9. The right and left output pixel values generated by the shifty block 97 may each be defined by 1, 2, 4, or some other bits of data (again, otherwise referred to as "vcodes"). The vcodes generated by the shifty block may then be passed on to the packer 23.

Figure 10:
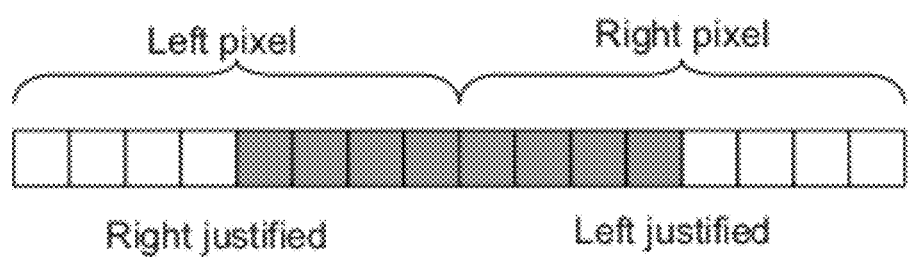
FIG. 10 illustrates two adjacent pixels with sub-pixels, in accordance with various embodiments of the present invention.

Before proceeding further, the concept of justification will now be briefly discussed. FIG. 10 illustrates a pair of adjacent pixels (a left and a right pixel subdivided into eight sub-pixels) for 4 bpp (bits per pixel) data. In this example, the left pixel is right justified, and as a result, the sub-pixels on the right side are initially filled first (i.e., where the toner will be placed). In contrast, the right pixel is left justified, and as a result, the sub-pixels on the left side are initially filled. By right justifying the left pixel and left justifying the right pixel, a larger single pixel (i.e., "super pixel") may be formed. In some embodiments, in order to make pixels right or left justified (or center or split justified), data bits for justification information may be added or included to the vcodes outputted by the halftone core 22. However, in alternative embodiments, which will be described below, such justification bits may not be included in the vcodes outputted by the halftone core 21.

Figure 11:
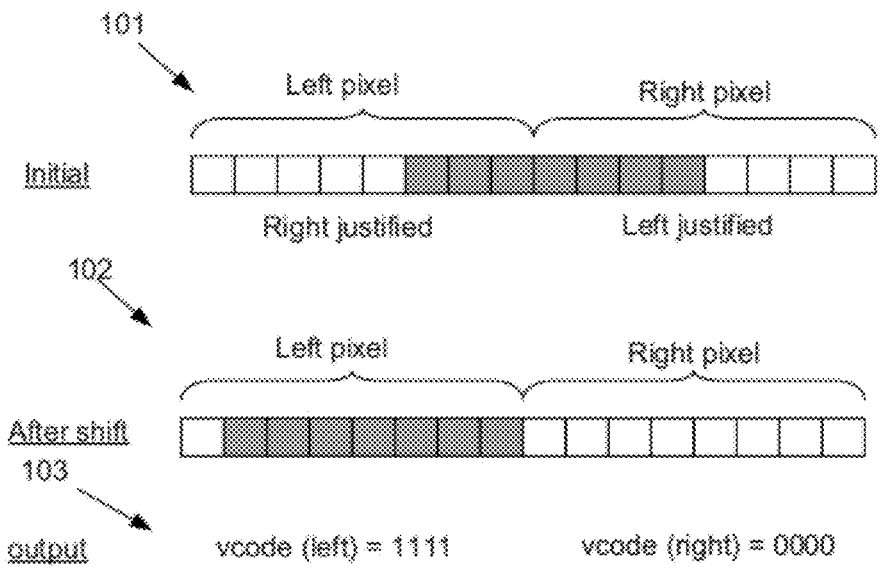
FIG. 11 illustrates an example of how vcodes for a left and a right image pixel may be generated from a shift and a size value, in accordance with various embodiments of the present invention.

FIG. 11 illustrates an example of how a shift, as provided by the unpacker 21, and a size value, as provided by the index block 93 of the halftone core 22, are employed by the shifty block 97 to output a left and a right vcode. For purposes of this example, suppose the value of the size provided by the index block 93 is seven and the shift provided by the unpacker 21 is minus six (−6). Note that a shift value may be signed (either negative or positive) to indicate directionality. The size and shift values may be processed according to this algorithm. Take the size value and split it in half. Put half into the left subpixels and half into the right subpixels. If there is a remainder when splitting the size in half, put it with the right subpixel. The values placed in these subpixel bins are the number of subpixels to fill. The subpixels start out gravitated towards the center of the pixel pair. The initial fill pattern for a right and left justified pixel pair may look like the fill pattern as indicated by reference 101. Note that seven sub-pixels are filled, the three sub-pixels on the right side of the left pixel (i.e., the right justified pixel), and the four sub-pixels on the left side of the right pixel (i.e., the left justified pixel). The shift value may then be used to force the bits to the left or right. There are limits in the shifting. For example, filled subpixels cannot drop off at either ends. Unfilled subpixels from one side cannot shift into the other side.

After applying the shift to the size value, the resulting sub-pixels may be filled like the fill pattern as indicated by reference 102 where the filled sub-pixels have been shifted to the left. Based on the size value and the shift provided to the shifty block 97, the shifty block 97 may generate two 4-bit vcodes for the left and the right pixel as indicated by reference 103. Alternatively, the vcodes generated may be 1-bit or 2-bit vcodes.

Typically in some conventional printer systems, two bits may be added to the vcodes to indicate justification (left, right, center or split). For 2 bpp data, the addition of justification bits significantly grows the data. Thus, in accordance with various embodiments of the present invention, vcodes may be provided by the halftone core 22 that do not include data bits for justification information. Such justification information may not be needed if such justification information is provided by the video block 14. For these embodiments, the justification information may be provided by the video block 14 (see FIG. 1).

Referring back to FIG. 2, the vcodes (i.e., reference 30 and 31) outputted by the halftone core 22, as depicted, may be provided to the packer 23. After receiving the vcodes, the packer 23 may perform various operations including removing the replicated end pixel values (i.e., vcodes) from even lines (for odd lines all vcodes may be used), and packing the vcodes, which may be in the form of 1/2/4 bit data, into 32-bit data blocks to be used by the write DMA. The packer may also take into account, when packing, the directionality of the lines (i.e., the serpentine nature of the inputted data). For L2R lines, the received vcodes are packed starting with the "leftmost" portion of the word (i.e., bit 31). For the R2L lines, the vcodes are packed starting with the rightmost portion of the word (i.e., bit 0). The write DMA 24 may take the output from the packer 23 and write the output continuously into the memory 13, while taking into account the "serpentine" direction of each scan line.

Figure 12:
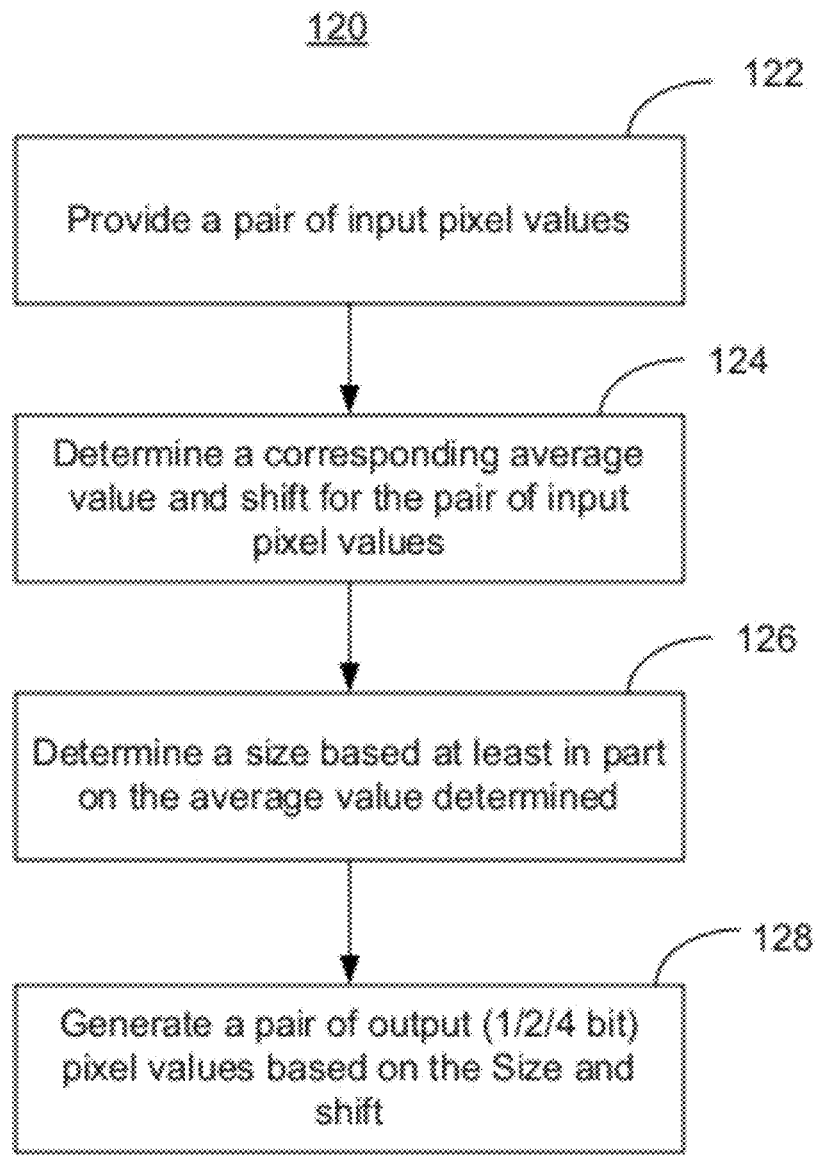
FIG. 12 is a flow chart representing a method in accordance with various embodiments of the present invention.

FIG. 12 is a flow process that generally represents the overall process for generating two output pixel values (i.e., vcodes) as described above in accordance with some embodiments of the present invention. The output pixel values may be used to generate a pair of image pixels of a printed image. The process 120 may begin when a pair of input pixel values is retrieved or provided at 122, wherein the input pixel values may each be defined by x bits of data.

A corresponding average value and shift for the pair of input pixel values may then be determined at 124. Next, a size is determined based at least in part on the average value determined at 126. In order to determine the size, error diffusion operations may be performed. A pair of vcodes (i.e., output pixel values) may then be generated based on the size and shift that were determined, wherein the output pixel values may each be defined by y bits of data. In some embodiments, x is greater than y, wherein x may be equal to 8 or some other number, and y may be equal to 1, 2, 4 or some other number. The process 120 may be repeated over and overall again for each pair of image pixels that will make up the printed image.

In embodiments of the present invention, an article of manufacture may be employed to implement one or more methods and/or operations as disclosed herein. For example, in exemplary embodiments, an article of manufacture may comprise a storage medium, which may be a computer readable storage medium, and a plurality of programming instructions stored in the storage medium and adapted to program an apparatus to enable the apparatus to implement one or more methods and/or operations as disclosed herein.

Although specific embodiments have been illustrated and described herein, it will be appreciated by those of ordinary skill in the art and others, that a wide variety of alternate and/or equivalent implementations may be substituted for the specific embodiments shown in the described without departing from the scope of the present invention. This application is intended to cover any adaptations or variations of the embodiments discussed herein. Therefore, it is manifested and intended that various embodiments of the invention be limited only by the claims and the equivalents thereof.

What is claimed is:

1. A method of printing an image, the method comprising:
   grouping a plurality of input pixel values into pairs, the input pixel values being related to the image;
   averaging the input pixel values for each pair, wherein the average of the input pixel values for each pair indicates a magnitude of the pair;
   calculating a shift value for each pair, wherein the shift value for each pair indicates a distribution of the magnitude of the pair;
   generating, by a halftoner block, pairs of output pixel values based on the shift values, wherein the output pixel values do not include justification information;
   providing, by the halftoner block, the output pixel values to a video block;
   generating, by the video block, pixels of the image based on the output pixel values;
   adding, by the video block, justification information to the output pixel values to facilitate generation of the pixels of the image; and
   providing the pixels to a printing device for printing the image based on the pixels of the image.

2. The method of claim 1, wherein printing the image comprises printing lines of pixels multiple times.

3. The method of claim 1, wherein:
   the input pixel values are each defined by x bits of data; and
   the output pixel values are each defined by y bit(s) of data, x being greater than y.

4. The method of claim 1, further comprising generating, for each average of input pixel values, a corresponding size value of the average, the size value to be used for generation of a pair of output pixel values.

5. The method of claim 4, further comprising performing an error diffusion process for each average, wherein the error diffusion process provides corrected data to facilitate the generation of the corresponding size values.

6. The method of claim 1, wherein the averaging the input pixel values for each pair comprises:
   calculating an error average for a first average; and
   determining a second average based at least in part on the error average.

7. An apparatus comprising:
   an unpacker configured to
   group a plurality of input pixel values into pairs, the input pixel values being related to an image to be printed,
   average the input pixel values for each pair, wherein the average of the input pixel values for each pair indicates a magnitude of the pair, and
   calculate a shift value for each pair, wherein the shift value for each pair indicates a distribution of the magnitude of the pair;
   a halftone core coupled to the unpacker, the halftone core configured to
   receive the shift values from the unpacker, and
   generate pairs of output pixel values based at least in part on the shift values, wherein the output pixel values do not include justification information;
   a write direct memory access (DMA) configured to provide the output pixel values from the halftone core to a video block; and
   the video block configured to generate pixels of the image based on the output pixel values,
   wherein the video block is further configured add justification information to the output pixel values to facilitate generation of the pixels of the image.

8. The apparatus of claim 7, wherein the video block is further configured to cause a printing device to print the image based on the pixels.

9. The apparatus of claim 7, wherein:
   the unpacker is configured to receive input pixel values that are each defined by 8 bits of data; and
   the halftone core is configured to generate pairs of output pixel values, wherein each output pixel value is defined by 1, 2, or 4 bits of data.

10. The apparatus of claim 7, wherein the halftone core is further configured to generate, for each average of input pixel value provided by the unpacker, a corresponding size value of the average, the size value to be used for generation of a pair of output pixel values.

11. The apparatus of claim 10, wherein the halftone core is further configured to perform an error diffusion process for each average, wherein the error diffusion process provides corrected data to facilitate the generation of the corresponding size values.

12. The apparatus of claim 7, wherein the halftone core comprises a shifty block, wherein the shifty block is configured to:
   receive (i) the size values and (ii) the shift values; and
   generate the pairs of output pixel values based at least in part on (i) the size values and (ii) the shift values.

13. The apparatus of claim 7, wherein the unpacker is further configured to determine the averages by (i) calculating an error average for a first average and (ii) determining a second average based at least in part on the error average.

14. An article of manufacture comprising:
   a storage medium; and
   a set of instructions stored in the storage medium, which, when executed by an apparatus, causes the apparatus to perform operations comprising
   grouping a plurality of input pixel values into pairs, the input pixel values being related to the image;
   averaging the input pixel values for each pair, wherein the average of the input pixel values for each pair indicates a magnitude of the pair;
   calculating a shift value for each pair, wherein the shift value for each pair indicates a distribution of the magnitude of the pair;
   generating pairs of output pixel values based on the shift values, wherein the output pixel values do not include justification information;
   providing the output pixel values to a video block;
   generating pixels of the image based on the output pixel values;
   adding justification information to the output pixel values to facilitate generation of the pixels of the image; and
   providing the pixels to a printing device for printing the image based on the pixels of the image.

15. The article of manufacture of claim 14, wherein the operations further comprise generating, for each average of input pixel values, a corresponding size value of the average, the size value to be used for generation of a pair of output pixel values.

16. The article of manufacture of claim 15, wherein the operations further comprise performing an error diffusion process for each of the averages, wherein the error diffusion process provides corrected data to facilitate the generation of the corresponding size values.

\* \* \* \* \*